(12) United States Patent
Wilczewski (10) Patent No.: US 9,287,925 B2
(45) Date of Patent: Mar. 15, 2016

(54) SYSTEMS AND METHODS FOR FREQUENCY HOPPING IN WIRELESS COMMUNICATION SYSTEMS

(71) Applicant: General Electric Company, Schenectady, NY (US)

(72) Inventor: Jeffrey Michael Wilczewski, Rochester, NY (US)

(73) Assignee: General Electric Company, Schenectady, NY (US)

( * ) Notice: Subject to any disclaimer, the term of this patent is extended or adjusted under 35 U.S.C. 154(b) by 56 days.

(21) Appl. No.: 14/152,546

(22) Filed: Jan. 10, 2014

(65) Prior Publication Data
US 2015/0200710 A1 Jul. 16, 2015

(51) Int. Cl.
*H04L 7/00* (2006.01)
*H04B 1/715* (2011.01)
*H04W 28/04* (2009.01)
*H04B 1/713* (2011.01)
*H04W 72/04* (2009.01)

(52) U.S. Cl.
CPC ............... *H04B 1/715* (2013.01); *H04B 1/713* (2013.01); *H04W 28/044* (2013.01); *H04W 28/048* (2013.01); *H04W 72/0453* (2013.01); *H04B 2001/7154* (2013.01)

(58) Field of Classification Search
CPC .................. H04B 1/713; H04B 1/715; H04B 2001/7154; H04B 7/2621; H04W 28/048; H04W 16/10; H04W 72/0453; H04L 1/0002; H04L 1/1671; H04L 47/10
See application file for complete search history.

(56) References Cited

U.S. PATENT DOCUMENTS

| 5,513,210 | A |   | 4/1996 | Vook et al. |
| 5,583,866 | A | * | 12/1996 | Vook ................... H04L 12/1877 370/312 |
| 5,726,984 | A |   | 3/1998 | Kubler et al. |
| 5,768,696 | A |   | 6/1998 | Law |

(Continued)

FOREIGN PATENT DOCUMENTS

| WO | 2009050539 A1 | 4/2009 |
| WO | 2012109478 A1 | 8/2012 |

OTHER PUBLICATIONS

Tourrilhes, "Dwell Adaptive Fragmentation: How to Cope With Short Dwells Required by Multimedia Wireless LANs", IEEE Global Telecommunications Conference, San Francisco, vol. No. 1, pp. 57-61, Nov. 27, 2000-Dec. 1, 2000.

(Continued)

*Primary Examiner* — Tesfaldet Bocure
(74) *Attorney, Agent, or Firm* — Armstrong Teasdale LLP (57) ABSTRACT

A method may include determining whether events associated with at least one of a plurality of wireless devices are active. The method may then include sending a first command to each of the plurality of wireless devices when the events are not active, such that the first command changes a first frequency to a second frequency. The method may also include sending a second command to each wireless device of a portion of the plurality of wireless devices when the events are active, such that the second command changes the first frequency to the second frequency. Here, each wireless device of the portion of the plurality of wireless devices is not associated with the events. The method may then include changing a third operation of a first wireless device associated with the events from the first frequency to the second frequency after the events are not active.

14 Claims, 8 Drawing Sheets

(56) References Cited

U.S. PATENT DOCUMENTS

| | | |
|---|---|---|
| 6,292,494 B1 | 9/2001 | Baker et al. |
| 7,194,003 B2 | 3/2007 | Danner et al. |
| 7,606,594 B2 | 10/2009 | Jesse et al. |
| 7,953,227 B2 | 5/2011 | Meier et al. |
| 7,961,740 B2 | 6/2011 | Flammer, III et al. |
| 8,065,099 B2 | 11/2011 | Gibala et al. |
| 8,126,442 B2 | 2/2012 | Wolfe |
| 8,249,499 B2 | 8/2012 | Waung et al. |
| 2006/0030362 A1 | 2/2006 | Fukuda |
| 2009/0141738 A1* | 6/2009 | Li ................... H04L 12/413 370/448 |
| 2009/0274130 A1 | 11/2009 | Boch |
| 2010/0111054 A1* | 5/2010 | Dhanapal ............ H03M 13/373 370/338 |
| 2010/0195574 A1 | 8/2010 | Richeson et al. |
| 2010/0248630 A1 | 9/2010 | Abraham et al. |
| 2010/0278187 A1 | 11/2010 | Hart et al. |
| 2011/0158160 A1 | 6/2011 | McCullough |
| 2011/0188516 A1 | 8/2011 | Borleske et al. |
| 2012/0054852 A1 | 3/2012 | Gibbs et al. |
| 2012/0287849 A1 | 11/2012 | Wilczewski |

OTHER PUBLICATIONS

Wang et al., "Evaluating and Improving the TCP/UDP Performances of IEEE 802.11 (p)/1609 Networks", IEEE Symposium on Computer and Communications, pp. 163-168, Jul. 6, 2008.

PCT Search Report and Written Opinion issued in connection with corresponding PCT Application No. PCT/US2015/010765 on Jun. 24, 2015.

PCT Invitation to Pay Additional Fees issued in connection with corresponding Application No. PCT/US2015/010765 on Apr. 23, 2015.

* cited by examiner

SYSTEMS AND METHODS FOR FREQUENCY HOPPING IN WIRELESS COMMUNICATION SYSTEMS

BACKGROUND

The subject matter disclosed herein generally relates to devices performing wireless communications. Specifically, the embodiments disclosed herein relate to systems and methods for providing a reliable channel access protocol among a wide variety of wireless devices.

Many devices may communicate with one another wirelessly. The devices, which may include a transmitter and/or receiver, may access a frequency channel within a particular frequency spectrum to send and/or receive data from other devices using the frequency channel. For example, many industries, such as oil, gas, and energy operations, may use monitoring devices, which collect data related to certain tasks (e.g., energy production, motor speed, etc.) and may wirelessly send the collected data to a control system that monitors the oil, gas, and energy operations.

Generally, wireless devices may follow particular channel access protocols to gain channel access between devices to minimize a risk of interference between the devices, collisions between competing data transmissions, excessive delay of data transmissions, and other communication breakdowns. However, due to certain regulations for communicating using certain frequency spectrums, the currently available channel access protocols may not enable the devices to communicate with each other efficiently. Accordingly, improved systems and methods for employing a channel access protocol in a wireless communication system are desirable.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a method may include determining, via a first wireless device of a plurality of wireless devices, whether one or more data communication events associated with at least one of the plurality of wireless devices are active. The method may then send a first command to each of the plurality of wireless devices when the one or more data communication events are not active, such that the first command may change a first operation of each of the plurality of wireless devices from operating at a first frequency to operating at a second frequency. The method may then include sending a second command to each wireless device of a portion of the plurality of wireless devices when the one or more data communication events are active. Here, the second command may change a second operation of each wireless device of the portion of the plurality of wireless devices from the first frequency to the second frequency, such that each wireless device of the portion of the plurality of wireless devices is not associated with the one or more data communication events. The method may then include changing a third operation of the first wireless device from the first frequency to the second frequency after the one or more data communication events are not active, such that the first wireless device may be associated with the one or more data communication events.

In a second embodiment, a method may include determining, via a first wireless device of a plurality of wireless devices, a first amount of time remaining before a next scheduled frequency hop time; determining, via the first wireless device, a second amount of time for a downstream data transmission between the first wireless device and a second wireless device of the plurality of wireless devices to complete; and fragmenting, via the first wireless device, a first data packet of the downstream data transmission into a first data packet fragment and a second data packet fragment when the second amount of time is greater than the first amount of time. The method may then include sending, via the first wireless device, the first data packet fragment to the second wireless device using a first frequency; changing the first frequency of the first wireless device to a second frequency at the next scheduled frequency hop time; and sending, via the first wireless device, the second data packet fragment to the second wireless device at the second frequency.

In a third embodiment, a system may include a first wireless device that may determine a first amount of time remaining before a subsequent scheduled frequency hop time and may determine a second amount of time for a downstream data transmission between the first wireless device and a second wireless device to complete. The first wireless device may then fragment a first data packet of the downstream data transmission into a first data packet fragment and a second data packet fragment when the second amount of time is greater than the first amount of time. The first wireless device may then send the first data packet fragment to the second wireless device using a first frequency. The system may also include a second wireless device that may determine a third amount of time for an upstream data transmission between the first wireless device and the second wireless device to complete. The second wireless device may also send a third data packet fragment using the first frequency when the third amount of time is greater than the first amount of time, such that the third data packet fragment may include a portion of a second data packet of the upstream data transmission.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. The term "channel access" refers to various systems and protocols used by wireless devices to negotiate access to channels within a frequency spectrum to send and/or receive data. The term "hop boundary" refers to the next time at which a wireless communication system may hop to a new frequency or frequency channel.

As mentioned above, wireless devices may follow particular channel access protocols to gain channel access between devices, such that the channel access protocols meet certain regulations for communication. That is, various frequency spectrums used for wireless communications may be overseen by certain governing bodies. For example, some frequency spectrums may be licensed and include certain regulations for the wireless devices that use the channels within those frequency spectrums. Additionally, frequency spectrums may have differing amounts of channels and bit rates based on a number and nature of the wireless devices expected to use the frequency spectrum. For instance, a frequency spectrum may have a bit rate based on the average expected distance between two wireless devices. In another example, the bit rate of the frequency spectrum may be based on the number of wireless devices a message may be sent to before the data reaches its intended recipient.

Keeping the foregoing in mind, a channel access protocol may provide a procedure that the wireless devices may perform to negotiate with one another to gain access to the various frequency channels available to them to send and/or receive data based on the specified frequency spectrum. One type of channel access protocol includes frequency hopping. Here, devices may periodically switch, or "hop" to a new frequency channel to attempt a data transmission. Although the frequency hopping protocol may effectively be used to transmit data, this protocol may not provide an efficient way to provide for channel access. For example, frequency hopping protocols first involve certain tuning processes before transmitting data to ensure that a device stays on a particular frequency channel long enough for an expected duration of the data transmission. Further, frequency hopping protocols may request that devices postpone data transmissions if it is expected that a data transmission will not complete before the next hop to another frequency channel.

Another type of channel access protocol includes carrier sense multiple access, which may verify the absence of other traffic before attempting a data transmission. Like the frequency hopping protocol described above, the carrier sense multiple access protocol may not efficiently transfer data between wireless devices. That is, carrier sense multiple access protocols may suffer from a "hidden node" problem, where a device may be visible to some of devices on a particular frequency channel, but not to all. Additionally, it may be difficult for a device to determine what a "clear channel" is within a noisy frequency spectrum.

Figure 1:
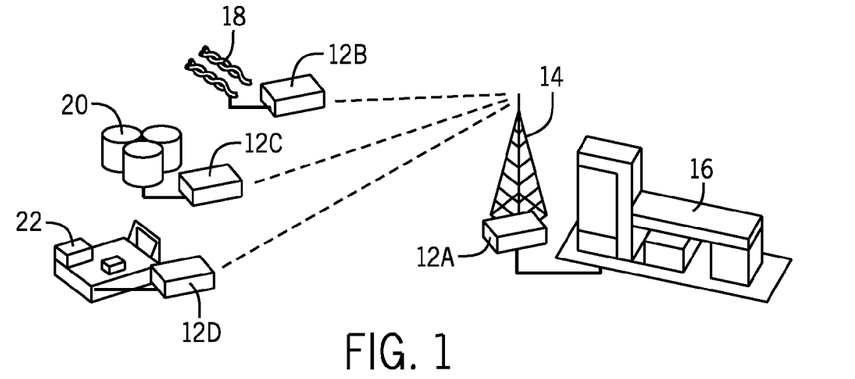
FIG. 1 is an illustration of a wireless communication system, in accordance with an embodiment of the present disclosure.

By way of introduction, FIG. 1 illustrates a wireless communication system 10. The wireless communication system 10 may include multiple wireless devices 12A, 12B, 12C, 12D. The wireless communication system 10 depicted in FIG. 1 provides an illustrative context of usage, in which the wireless device 12A may have a communicative link with a master station 14, which in turn may have a communicative link with a data control center 16. The other wireless devices 12B, 12C, 12D may connect to oil or gas wells and associated processing, transporting, and storing infrastructure. For example, the wireless device 12B may have a communicative link with fluid transport pipes 18, the wireless device 12C may have a communicative link with fluid tanks 20, and the wireless device 12D may have a communicative link with processing plant 22. Further, the wireless communication system 10 may use a channel access system, which may include control signals and frequency hopping protocols to increase a speed of data transmissions between devices and to reduce the risk of interference and collisions between data transmissions. Additional details with regard to the channel access system employed herein will be described in greater detail below.

As will be appreciated, the oil and gas operation depicted in FIG. 1 is but one example of a situation in which a wireless communication system 10 may be employed. As such, it should be understood that the systems and methods described herein may be employed in various types of operations and environments.

Figure 2:
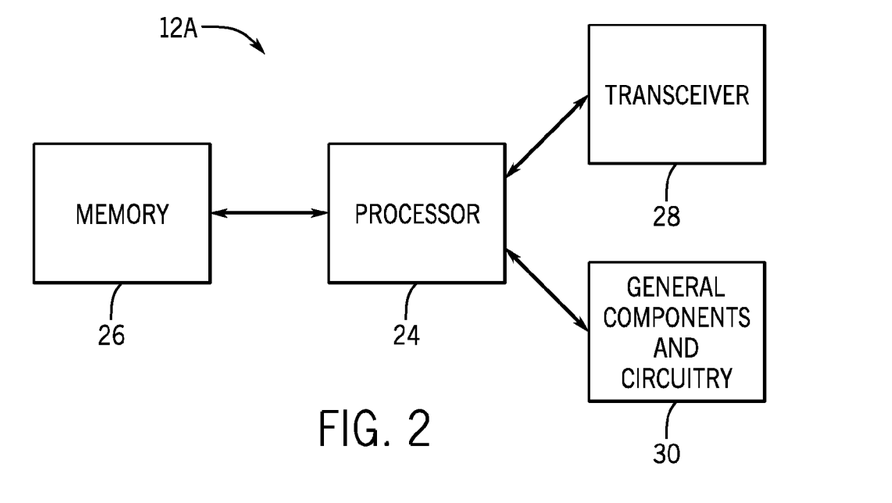
FIG. 2 is a block diagram of a wireless device for the wireless communication system of FIG. 1, in accordance with an embodiment of the present disclosure.

Each wireless device 12A, 12B, 12C, 12D in the wireless communication system 10 may include a processor 24, memory 26, and a transceiver 28, as shown in FIG. 2. For the purposes of discussion, the following description of FIG. 2 is made with reference to the wireless device 12A, but it should be understood that the features discussed below may be provided in each wireless device 12A, 12B, 12C, 12D.

The processor 24 may include, for example, general-purpose single- or multi-chip microprocessors. In addition, the processor 24 may be any conventional special-purpose processor, such as an application-specific processor or circuitry. The processor 24 and/or other data processing circuitry may be operably coupled to memory 26 to execute instructions pertaining to the specific wireless device 12A. For example, these instructions may be encoded in programs that are stored in the memory 26, which may be an example of a tangible, non-transitory computer-readable medium, and may be accessed and executed by the processor 24 to allow for the presently disclosed techniques to be performed. The memory 26 may be a mass storage device, a flash memory device, removable memory, or any other non-transitory computer-readable medium. Additionally and/or alternately, the instructions may be stored in an additional suitable article of manufacture that may include at least one tangible, non-transitory computer-readable medium that at least stores these instructions or routines in a manner similar to the memory 26 as described above.

The transceiver 28 may be any suitable circuitry or component operably coupled to the processor 24 for sending and/or receiving data. In certain embodiments, the wireless device 12A may include a separate transmitter and receiver instead of the integral transceiver 28. Although each of the presently disclosed wireless devices 12A, 12B, 12C, 12D may be described as having the transceiver 28, it should be noted that in other embodiments a single transceiver 28 may be coupled to the processor 24 of several wireless devices (e.g., wireless devices 12A, 12B, 12C, 12D). The wireless device 12A may also include general components and circuitry 30 which relate to the specific tasks performed by the particular wireless device 12A.

Figure 3:
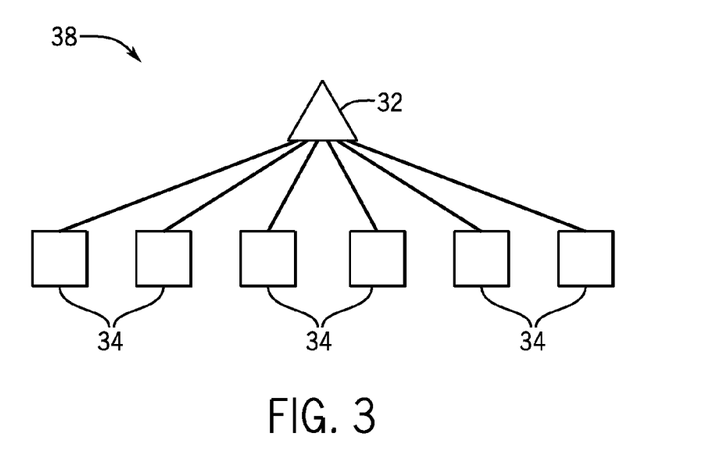
FIG. 3 is a block diagram of a star network configuration that may be employed in the wireless communication system of FIG. 1, in accordance with an embodiment of the present disclosure.
Figure 4:
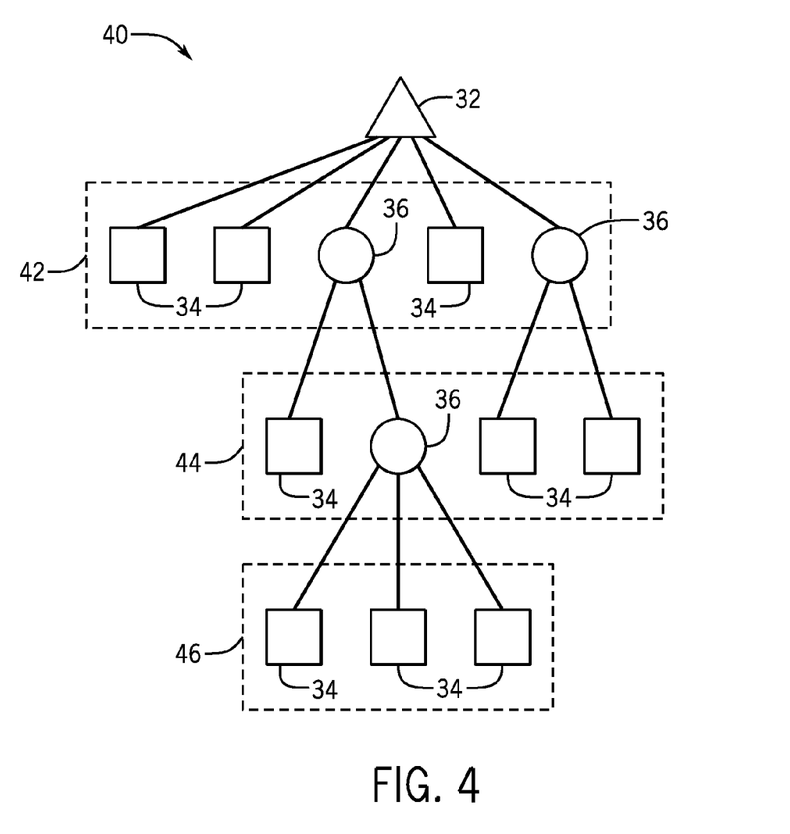
FIG. 4 is a block diagram of a tree network configuration that may be employed in the wireless communication system of FIG. 1, in accordance with an embodiment of the present disclosure.

FIGS. 3 and 4 depict two common configurations that may be used for the wireless devices 12A, 12B, 12C, 12D in the wireless communication system 10. A star network 38, as shown in FIG. 3, may include a single access point 32 and any number of remotes 34, which may communicate with the access point 32 but not with other remotes 34. Referring back to FIG. 1, the wireless communication system 10 depicted represents the star network 38. The star network 38 may be referred to as a "single-hop" communication network, since data transmission occurs directly between the sender and recipient.

FIG. 4 illustrates a tree network 40, which may include the single access point 32, any number of remotes 34, and any number of routers 36. The access point 32 may communicate directly with the remotes 34 and routers 36 in a first tier 42, as illustrated; however, none of the wireless devices 12 in the first tier 42 may communicate with one another. The routers 36 in the first tier 42 may communicate with any number of remotes 34 and routers 36 in a second tier 44. Similar to the wireless devices 12 of the first tier 42, the remotes 34 and the routers 36 in the second tier 44 may not communicate directly with one another. Any routers 36 in the second tier 44 may communicate with any number of remotes 34 and routers 36 in a third tier 46; the remotes 34 and the routers 36 in the third tier 46 may not communicate directly with one another. Although FIG. 4 depicts three tiers, it should be appreciated that any number of tiers may exist in a tree network 40, so long as the number of tiers is greater than or equal to two. A tree network 40 may be referred to as a "multi-hop" communication network as data transmission occurs indirectly between the sender and recipient; that is, the data transmission must pass through at least one additional wireless device 12 before reaching the target of the data transmission.

Keeping the foregoing in mind, the wireless devices 12A, 12B, 12C, 12D in the wireless communication system 10 may be divided into three categories: access points 32, remotes 34, and routers 36. The access point 32 may be a wireless device that acts as a coordinator of the communications in the wireless communication system 10. Referring back to FIG. 1, the wireless device 12A may be the access point 32, as it may be communicatively coupled to the master station 14 and by extension to the data control center 16. The wireless communication system 10 may, in one embodiment, have one access point 32, although it may have multiple access points 32 depending on the operation in which the wireless communication system 10 is employed. In certain embodiments, the access point 32 may communicate with a portion or all of the remotes 34 and routers 36, depending on the configuration of the wireless communication system 10.

The remote 34 may be a wireless device that acts as an end device within the wireless communication system 10. The remote 34 may not route wireless traffic, unlike the access point 32 or the router 36, but may communicate with both the access point 32 and a portion of the routers 36, depending on the configuration of the wireless communication system 10. Common examples of the remote 34 may include sensors (e.g., global positioning system (GPS) sensors, speed sensors, etc.) and controllers (e.g., programmable logic controllers, remote terminal units, etc.). For instance, the wireless devices 12B, 12C, 12D in FIG. 1 may all be remotes 34. The wireless communication system 10 may have any number of the remotes 34.

The router 36 may be a wireless device that may route wireless traffic from the access point 32 to one or more remotes 34 and, in some embodiments, to one or more routers 36. As such, the router 36 may communicate with the access point 32, a portion of the remotes 34, and a portion of the routers 36, depending on the configuration of the wireless communication system 10. The wireless communication system 10 may have any number of the remotes 36.

As discussed above, the wireless devices 12A, 12B, 12C, 12D may communicate with one another via a set of frequency channels within a particular frequency spectrum. For example, the 900 MHz industrial, scientific, and medical (ISM) band is a frequency spectrum allocated for amateur radio and other industrial, scientific, and medical equipment. The particular frequency spectrum used by the wireless devices 12A, 12B, 12C, 12D may be licensed or unlicensed. Some frequency spectrums (e.g., 200 MHz, 400 MHz, etc.) may have low bandwidth channels, while others may have high bandwidth channels. Still other frequency spectrums may be fixed frequency narrowband networks, while others may be higher speed multi-channel networks. The number of frequency channels as well as a bit rate of each frequency channel in a particular frequency spectrum may be determined in part by a number and type of wireless devices using the frequency spectrum and the average expected time and size of a data transmission, among other things.

As mentioned above, the channel access protocol may include methods by which the wireless devices 12A, 12B, 12C, 12D may negotiate with each other to gain access to a frequency channel and transmit data between each other. In particular, channel access protocol may be designed to minimize the risk of interference between devices and collisions between data transmissions, which may result in repeated data transmissions by wireless devices 12A, 12B, 12C, 12D to ensure that the data transmission is completed and received by the appropriate target.

Figure 5:
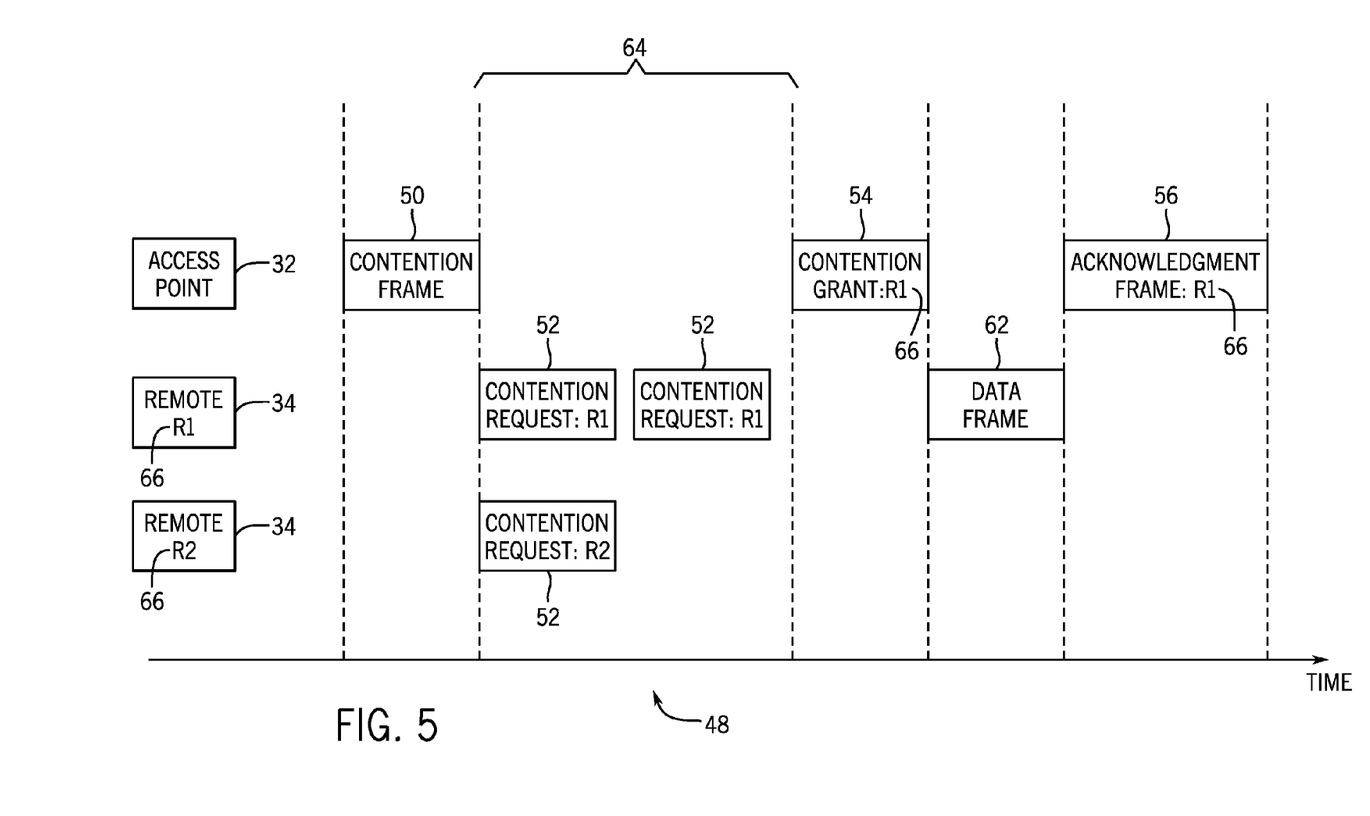
FIG. 5 is a timing diagram of an upstream data transmission that may be employed in the wireless communication system of FIG. 1, in accordance with an embodiment of the present disclosure.
Figure 6:
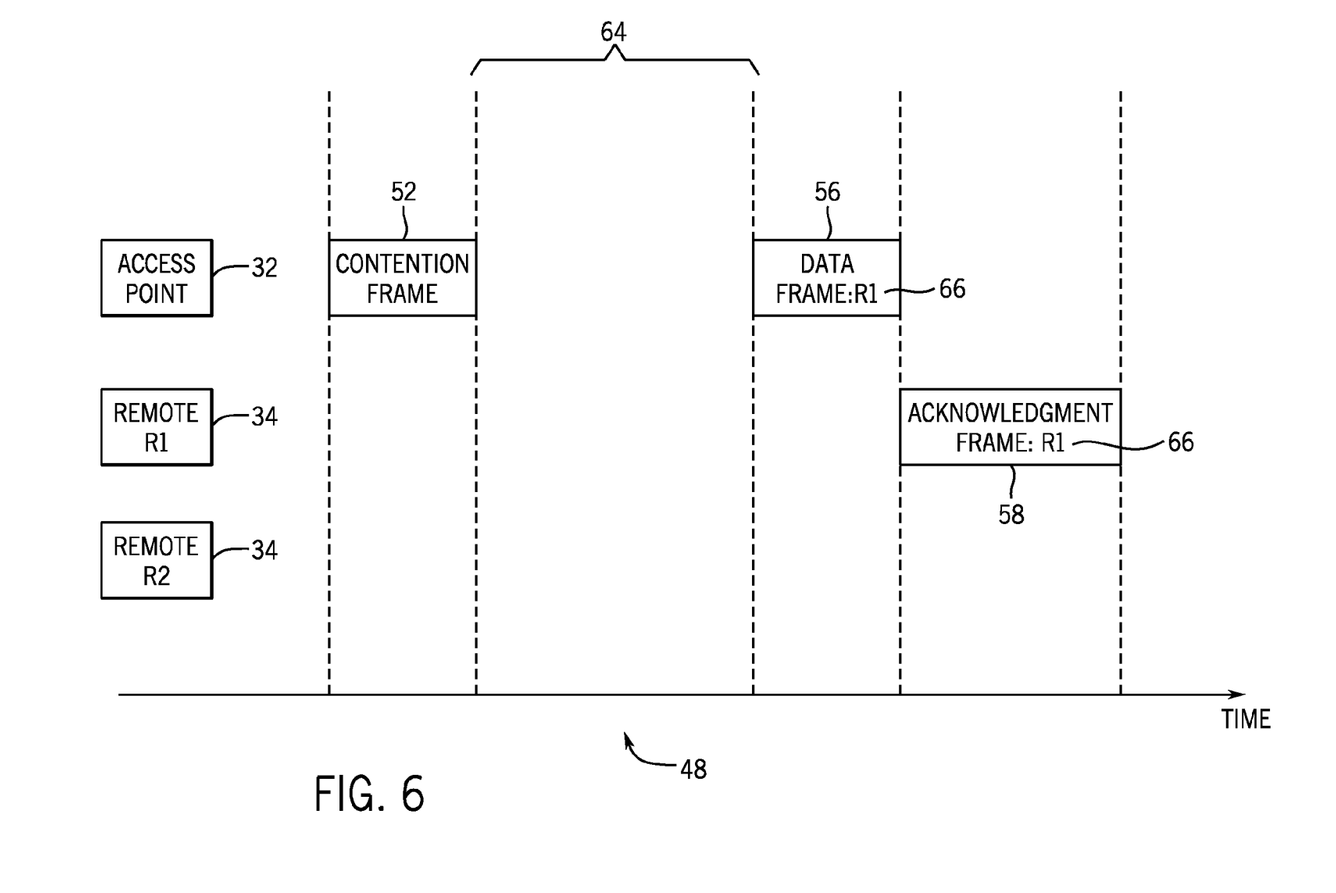
FIG. 6 is a timing diagram of a downstream data transmission that may be employed in the wireless communication system of FIG. 1, in accordance with an embodiment of the present disclosure.
Figure 7:
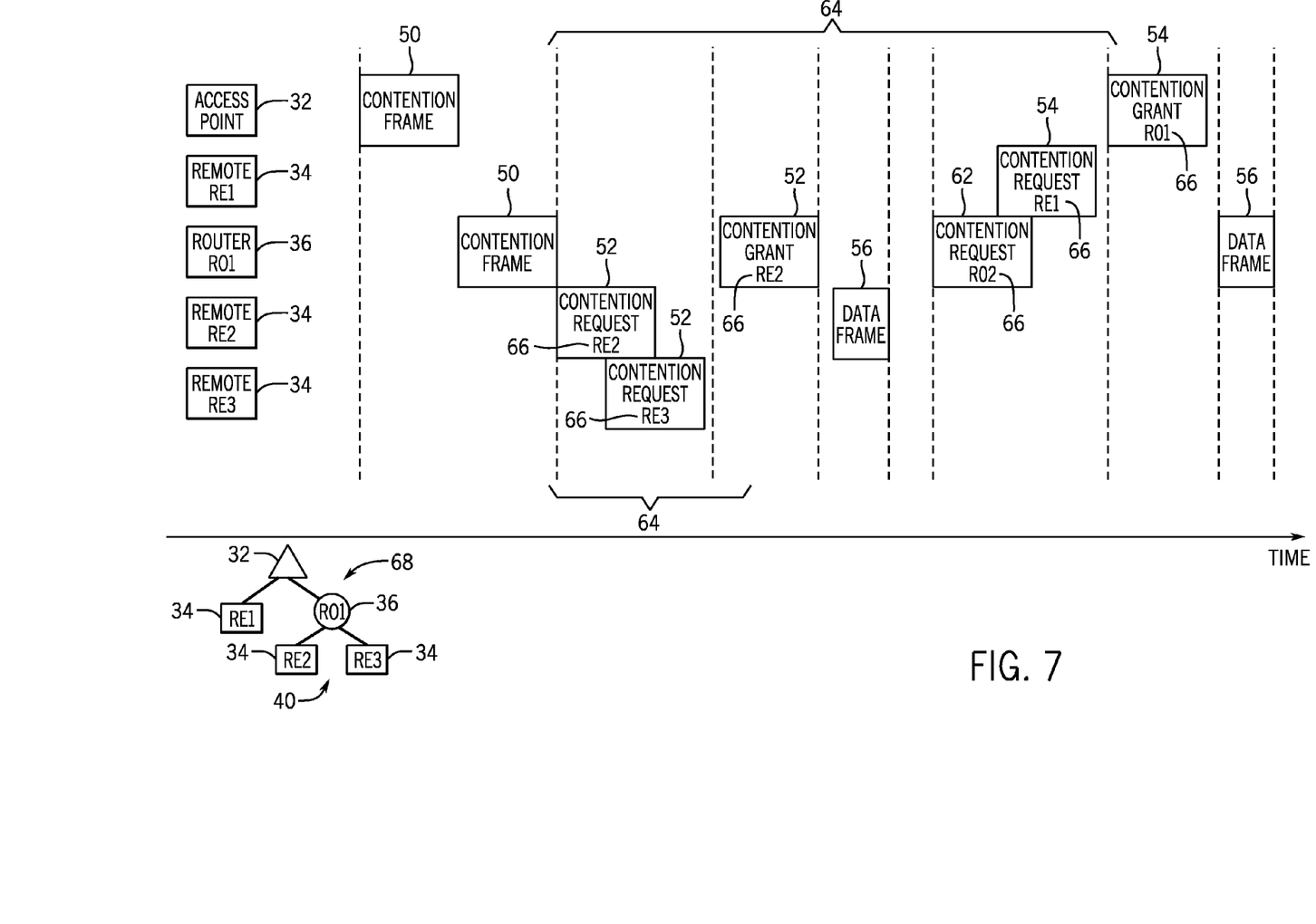
FIG. 7 is a timing diagram of an upstream data transmission that may be employed in the wireless communication system of FIG. 1, in accordance with another embodiment of the present disclosure.

To reduce the risk of interference and collisions between data transmissions, the wireless devices 12A, 12B, 12C, 12D in the wireless communication system 10 may use a channel access system, which may include methods for frequency hopping using control signal frames. For example, FIGS. 5-7 depict three embodiments of how control signal frames 48 may be used to employ a frequency hopping protocol in the wireless communication system 10. In one embodiment, the control signal frames 48 may restrict the remotes 34 and the routers 36 from participating in data transactions unless given permission by the access point 34. Further, as described below, the control signal frames 48 may be used to augment the frequency hopping protocol by providing timing information for hops and a hopping sequence. The methods for frequency hopping, described in detail with respect to FIGS. 8-10, may allow different types of networks (e.g., star or tree networks) to perform frequency hopping with relatively low amounts of latency and failed data transmissions as compared to conventional frequency hopping or carrier sense multiple access protocols.

Turning now to FIG. 5, an example of an upstream data transmission in a wireless communication system 10 is presented. The control signal frames 48 may include small sets of data that generally indicate a particular state of the corresponding wireless device 12A, 12B, 12C, 12D. In certain embodiments, the control signal frames 48 may include a contention frame 50, a contention request 52, contention grant 54, and an acknowledgment frame 56. These frames may be used in conjunction with data frames 62 to perform data transmissions.

As mentioned above, the wireless communication system 10 may include an access point 32 and two remotes 34. As such, the upstream data transmission illustrated in FIG. 5 may correspond to the wireless communication system 10 as the star network configuration 38.

Keeping this in mind and referring to FIGS. 3 and 5, the access point 32 may initiate a data transmission by broadcasting a contention frame 50 to all of the remotes 34. Upon broadcasting the contention frame 50, the access point 32 may begin a contention period 64, in which the remotes 34 may compete with one another to perform a data transaction. Once one of the remotes 34 receives the contention frame 50, and if it has data to transmit, the respective remote 34 may send a contention request 52 to the access point 32 at any point during the contention period 64 to request access to the particular frequency channel that the access point 32 may be using. The length of the contention period 64 may vary based on an average expected time for the respective remote 34 to receive the contention frame 50 and send the contention request 52, a number of wireless devices currently operating in the wireless communication system 10, a physical distance over which the wireless signal must propagate, and the like. If the access point 32 receives no contention requests 52 during the contention period 64, then it may re-broadcast the contention frame 50 to all of the remotes 34.

Since there may be multiple remotes 34 operating within the wireless communication system 10, the contention request 52 may include a device address 66 associated with a particular remote 34. As will be appreciated, each wireless device 12A, 12B, 12C, 12D may include its own device address 66 when sending the control signal frames 48 to identify itself as the sender of the frame. The contention request 52 may also include an amount of data that the remote 34 may request to send. As such, the contention request 52 may affect whether the remote 34 is granted access to the access point 32 when there is an upcoming hop by the respective wireless device 12A, 12B, 12C, 12D.

Once the access point 32 begins to receive contention requests 52 from the remotes 34, the access point 32 may send a contention grant 54 to notify the corresponding remote 34 that it has permission to perform the respective data transmission if there is a free channel. If a particular remote 34 does not receive a contention grant 54 within the contention period 64, then the respective remote 34 may assume that there is congestion and remain silent until it receives another contention frame 50. In other embodiments, the access point 32 may broadcast the contention grant 54 to all of the remotes 34 and may include the respective device address 66 of the respective remote 34 that will participate in the data transmission; the remotes 34 may then determine by the respective device address 66 if they will be allowed to send data upstream. The contention grant 54 may also include an amount of data that the remote 34 may be allowed to transmit at that time. In one embodiment, the amount of data that the remote 34 may be allowed to transmit may not be equal to the amount of data listed in the contention request 52.

Although FIG. 5 depicts that the participating remote 34 is selected based on when the contention requests 52 are received, it should be appreciated that other methods may be used to select the respective remote 34 to receive the contention grant 54. For example, the access point 32 may use a pseudo-random generator to select the respective remote 34, or it may select the respective remote 34 based on the time period between the last communication with the respective remote 34 (e.g., which remote has been waiting the longest.) In another embodiment, the access point 32 may send the contention grant 54 to each remote 34 in a particular order or according to a set schedule for communication. Further, in some embodiments, the remotes 34 may include a priority level within the contention request 52 to indicate an importance and/or urgency of a particular data transmission. The access point 32 may then take the priority level into account when selecting the remote 34.

Once the respective remote 34 receives the contention grant 54, the respective remote 34 may then send a data frame 62 to the access point 32. The data frame 62 may include the device address 66 of both the source and destination devices. During this time period, all of the other remotes 34 may be silent. This silence may reduce the risk of data communication collisions due to multiple remotes 34 attempting to send data at the same time. The data communication collisions may lead to repeated transmissions to ensure that the transmission is successful. In some embodiments, the access point 32 may send an acknowledgment frame 56 to the remote 34 to signify a successful data transmission.

By using control signal frames 48, the wireless communication system 10 may be less susceptible to interference and collisions between data transmissions since all of the remotes 34 may be visible to the access point 32 and to each other. Further, because all of the other remotes 34 are silent during the actual data transmission, any risk of interference or collisions may occur primarily between control signal frames 48. This may be particularly beneficial in frequency spectrums that experience high amounts of noise and occasional frequency specific interference. Also, as mentioned above, the control signal frames 48 may include small sets of data (e.g., less than 20 bytes). As such, in the instances where there may be collisions or repeated transmissions, the wireless communication system 10 may experience minimal penalties or loss of efficiency.

FIG. 6 illustrates a downstream data transmission performed between the access point 32 and two of the remotes 34. In the event of a pending downstream data transaction, the access point 32 may send the data frame 62, as opposed to another contention frame 50 at the next opportunity for communication to the respective remote 34. Again, since all of the remotes 34 may be silent until they receive the contention grant 54, the probability that downstream traffic collides with upstream traffic may be minimal.

The control signal frames 48 may also be adapted for the tree network 40, as shown in FIG. 7. In the tree network 40, the routers 36 may act as both access points and remotes depending on a current state of the transmission. For example, FIG. 7 depicts a timing diagram for an upstream data transmission for an example tree network 68 also depicted in FIG. 7. As shown in FIG. 7, the access point 32 may directly communicate with the remote 34 with a device address 66 of RE1 and the router 36 with a device address 66 of RO1. The router 36, in turn, may directly communication with the remote 34 with a device address 66 of RE2 and the remote 34 with a device address 66 of RE3. As mentioned above, any data transmission may begin with the access point 32 sending the contention frame 50 followed by waiting for the contention period 64. However, as shown in FIG. 7, the router 36 (RO1) may act as the access point 32 of its own small network by forwarding the contention frame 50 to the wireless devices that it may communicate with and setting the contention period 64 during which the wireless devices it communicates with may respond with the contention request 52. In one embodiment, the access point 32 may determine a length of the contention period 64 based on an average transmission time for multiple hops of both the control signal frames 48 and the data frames 62.

Once the router 36 (RO1) receives the contention request 52 from the remote 34 (RE2) or the remote 34 (RE3), the router 36 (RO1) may forward the request to the access point 32, where the contention request 52 from the remote 34 (RE2) or the remote 34 (RE3) may compete against the contention request 52 from the remote 34 with the device address RE1. The access point 32 may then select one of the remotes 34 to participate in the data transmission and may send the contention grant 54 to the selected remote 34 or to the router 36. If the router 36 receives the contention grant 54, the router 36 may then forward the contention grant 54 to the appropriate remote 34, which may respond with the data frame 62, which may then be forwarded to the access point 32 by the router 36. As with the earlier examples of upstream and downstream data transmissions, all other remotes 34 that do not receive a contention grant 54 may be silent until the next contention frame 50 is broadcast. If the wireless communication system includes acknowledgement frames 56, then the access point 32 may send an acknowledgement frame 56 to the remote 34 that the access point 32 received data from. In some embodiments, contention requests 52 may be directly granted by the router 36 and may not be forwarded to the access point 32, as shown in FIG. 7. During the time period in which the router 36 acts like an access point 32, the remotes 34 communicate exactly as if they were communicating with an access point 32, but instead to their particular router 36. Then, during the time period in which the router 36 acts like a remote 34, the router 36 may transmit the data frame 62 as if it were the remote 34 the data frame originated from.

To further reduce the chances of being unable to communicate with each wireless device in the wireless communication system 10, the control signal frames 48 may also include synchronization frames and association frames to enable newly connected wireless devices to communicate within the wireless communication system 10. In one embodiment, a synchronization frame may be periodically generated by the access point 32 and the routers 36 and broadcast to all remotes 34 and routers 36 at a next available opportunity. The synchronization frame may include the current frequency channel of the access point 32, timing information for any upcoming hops, and a hopping sequence or method of calculating a hopping sequence. Upon receiving the synchronization frame, the remotes 34 may synchronize their communication schedules in time and frequency to match the access point 32. After each wireless device is synchronized with the access point 32, each wireless device may generate an association frame to send to the access point 32. Here, any wireless device in the wireless communication system 10 that has not sent the association frame after joining the wireless communication system 10 may send the association frame after synchronizing with the access point 32. In one embodiment, the association frame 60 may include a proposed device address 66 for the respective wireless device as well as a tier of the respective wireless device and corresponding routing information between the access point 32 and the respective wireless device. The access point 32 may then send a response frame to the respective wireless device with a finalized device address 66 to identify the respective wireless device. As a result, the wireless communication system 10 may be able to dynamically accommodate added or subtracted remotes 34. The wireless communication system 10 may also be able to dynamically switch between the star network 38 and the tree network 40 configurations based on the addition or subtraction of the routers 36. Table 1 includes a summary of all of the control signal frames 48 that the wireless devices may initiate.

TABLE 1

| Frame Type | Access Point Initiated | Remote Initiated | Router Initiated | Description |
|---|---|---|---|---|
| Contention Frame (CF) | X | | X | Frame alerts remotes of upcoming contention period |
| Contention Request (CR) | | X | X | Frame alerts AP/Router that remote is requesting access to the channel. A CR includes the requesting device's address, and how many bytes of data the radio wishes to transmit. |
| Contention Grant (CG) | X | | X | Frame alerts remote that it has been granted to the channel. A CG must include the granted device's address and how many bytes the requesting device is allowed to transmit |
| Data Frame (DF) | X | X | X | Frame used to pass payload data between AP/Router and remote or remote to AP/router. Frame includes source and destination addresses and a frame sequence number |
| Acknowledgment Frame (ACK) | X | X | X | Frame used to acknowledge successful receipt of a DF, contains a destination address and acknowledgment sequence number. |
| Synchronization Frame (SYNC) | X | | X | Used to synchronize the timing and frequencies used for frequency hopping if control signal frames are used in conjunction with a frequency hopping protocol |
| Association Frame (ASSOC) | X | X | X | Used when a new device joins the network to establish addressing and routing information. |

As mentioned above, the wireless communication system 10 may also employ methods for frequency hopping. In a frequency hopping protocol, the wireless communication system 10 may, after a period of time (referred to below as the "dwell time") move or "hop" to a new frequency. That is, all of the wireless devices 12A, 12B, 12C, 12D in the wireless communication system 10 may move to a new frequency channel after the dwell time has expired.

To reduce the risk of the wireless devices 12A, 12B, 12C, 12D moving to an incorrect frequency, moving too early or too late to the new frequency, or not moving to the new frequency at all, the wireless devices 12A, 12B, 12C, 12D may synchronize with one another. For example, the wireless devices 12A, 12B, 12C, 12D may use the synchronization frame described above to synchronize with each other. The synchronization frame may include timing information for the wireless communication system 10 and/or a method of calculating the specific frequencies (or channels) in the hopping sequence. In one embodiment, the wireless devices 12A, 12B, 12C, 12D may calculate the frequencies in the hopping sequence using a pseudo-random number generator, using as a common seed network ID representing the wireless communication system 10, and so forth.

Figure 8:
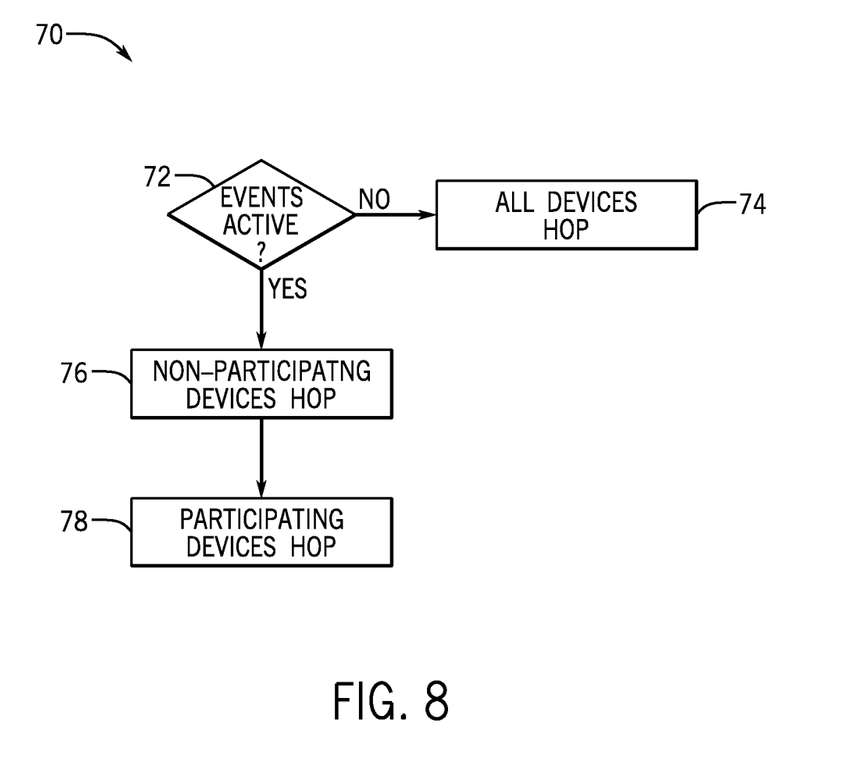
FIG. 8 is a flowchart of a frequency hopping protocol that may be employed in the wireless communication system of FIG. 1, in accordance with an embodiment of the present disclosure.

As mentioned above, the access point 32 may initiate all communications with the remotes 34. As such, the wireless communication system 10 may consider dwell times relative to events instead of time. FIG. 8 depicts a flowchart of a method 70 that the access point 32 in the star network configuration 38 may employ to perform a frequency hopping protocol. Although the method 70 is described as being performed by the access point 32, it should be noted that the method 70 may be performed by any of the wireless devices 12A, 12B, 12C, 12D in the wireless communication system 10.

In one embodiment, at block 72, the access point 32 may detect whether an event (e.g., a successful data transmission) has completed or is active. If there are no events that are active, the access point 32 may proceed to block 74 and send a command to all of the devices in the wireless communication system 10 to perform a frequency hop. Alternately or additionally, when no events are active, all wireless devices 12 in the network may use time to perform the frequency hop.

If, however, events are still active, the access point 32 may proceed to block 76 and send a command to all of the devices in the wireless communication system 10 that is not participating in the event to perform a frequency hop on a hop boundary. The hop boundary may be designated by the expiration of the dwell time. As such, the wireless devices 12 participating in the event (e.g., data transmission) may remain on the current frequency channel that the data transmission was initiated, and then hop to the correct frequency channel once the data transmission is complete (block 78). Meanwhile, the other devices in the wireless communication system 10 that are not participating in the event may still hop according to network dwell times at block 76.

If the wireless communication system 10 uses the control signal frames 48, then the remotes 34, which did not receive the contention grant 54, may be silent until they receive the contention frame 50. However, because the access point 32 is busy on another channel, the other remotes 34 may not receive the contention frame 50 and thus may be silent (i.e., holding pending data) until the access point 32 finishes the previous data transmission and hops to the new frequency channel. As a result, the wireless communication system 10 may lose less data lost due to a failed transmission during a hop. Additionally, by enabling the access point 32 and the corresponding remote 34 to finish the data transmission before hopping, communication between the access point 32 and all of the remotes 34 may resume immediately after the access point 32 hops.

Because participating wireless devices may remain on the same frequency channel until the data transmission is complete, the data transmission between the participating wireless device and the access point 32 may continue after the dwell time expires without experiencing a penalty for re-transmissions due to a hop. Further, the access point may not send data in stages when the wireless devices may determine that the data transmission may occur too close to the hop boundary to complete a data transmission and may postpone the data transmission until after the next hop. Indeed, any wait stages and re-transmissions due to a hop may be limited to the control signal frames 48, which, as mentioned above, are designed to be small in size and may have a very low impact in terms of latency.

In certain embodiments, the wireless communication system 10 having the tree network configuration 40 may use a different type of frequency hopping protocol. That is, the access point 32 may initially assume that the wireless communication 10 has a star network configuration 38 and may initially use the frequency hopping method 70 described above. However, once the access point 32 is alerted, via an association frame, that a router 36 has joined the wireless communication system 10, the access point 32 may generate a response to the association frame that may include a device address 66 for the newly connected router 36 as well as an offset that corresponds to the respective router 36 that joined the wireless communication system 10. As such, when the respective router 36 acts as an access point, the respective router 36 may apply the offset to the frequency hopping sequence to access a new channel. This may allow multiple routers on the same tier to co-exist, as they may have different offsets and therefore may be on different channels at the same time. Further, the synchronization information for the wireless devices may be created top-down, such that the respective router 36 may receive synchronization information from the access point 32 or the router 36 in a tier above the respective router 36. The respective router 36 may then generate a synchronization frame to send to the devices located a tier below the respective router 36, thereby allowing all of the devices across all tiers to maintain synchronization together.

Figure 9:
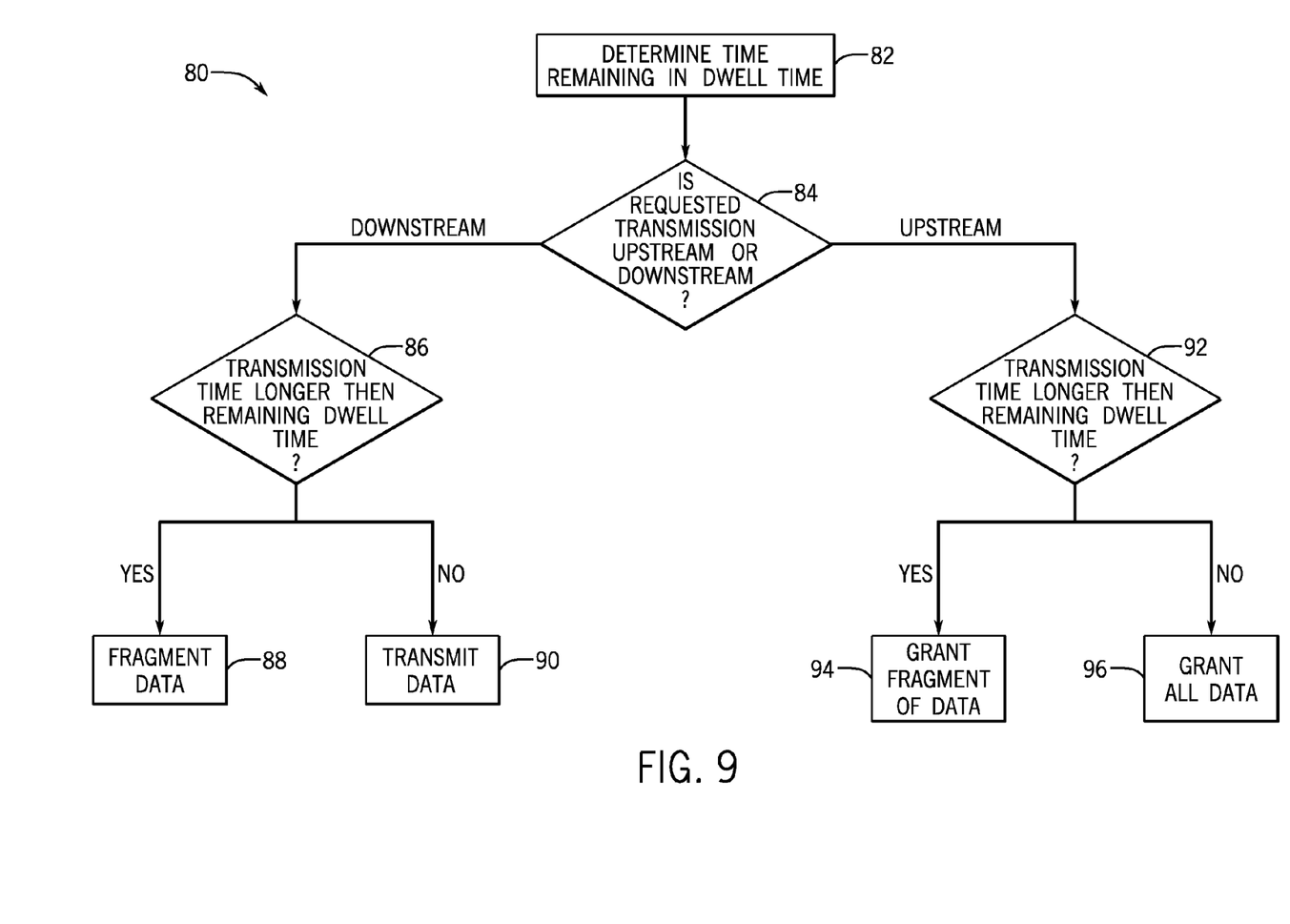
FIG. 9 is a flowchart of a frequency hopping protocol that may be employed in the wireless communication system of FIG. 1, in accordance with another embodiment of the present disclosure.

Referring now to the method 80 of FIG. 9, all of the data transmissions may occur as they would in the method 70, except that each data transmission may complete before the hop boundary. Because multiple tiers of devices are involved, allowing data transmissions to span hop boundaries may cause multiple devices and even entire tiers of devices to become out of sync with one another, especially if the data transmission spans multiple tiers.

Keeping this in mind, to allow for data transmissions to occur, the method 80 may dynamically fragment the data being transmitted as described below. In one embodiment, at block 82, the wireless device 12A, 12B, 12C, 12D (i.e., the access point 32 or the router 34) enforcing the hop boundary may determine an amount of time left in the dwell time. At block 84, the wireless device 12A, 12B, 12C, 12D may determine if the requested data transmission is intended for upstream transmission or downstream transmission. If the data transmission is downstream, the wireless device 12A, 12B, 12C, 12D may proceed to block 86. At block 86, the wireless device 12A, 12B, 12C, 12D may determine, based on a bit rate used for the data transmission, whether the transmission time is longer than the remaining dwell time. If the transmission time is longer than the remaining dwell time, the wireless device 12A, 12B, 12C, 12D may proceed to block 88. At block 88, the wireless device 12A, 12B, 12C, 12D may fragment the data to a size that fits into the remaining dwell time, such that the occupied bandwidth is maximized. The remainder of the data packet may then be deferred until the next transmission opportunity or after the next hop. In one embodiment, a data packet may be fragmented multiple times. For instance, the data packet may be fragmented multiple times when the fragmented data is still too large to send during a dwell time.

Referring back to block 86, if the transmission time is less than the remaining dwell time, the wireless device 12A, 12B, 12C, 12D may proceed to block 90. At block 90, the wireless device 12A, 12B, 12C, 12D may transmit the data normally (i.e., sending the data frame 62).

Referring back to block 84, if the requested data transmission is an upstream data transmission, the wireless device 12A, 12B, 12C, 12D may proceed to block 92. At block 92, the wireless device 12A, 12B, 12C, 12D may determine, based on the bit rate, whether the expected transmission time is longer than the remaining dwell time. If the expected transmission time is longer than the remaining dwell time, the wireless device 12A, 12B, 12C, 12D may proceed to block 94. At block 94, the wireless device 12A, 12B, 12C, 12D may receive fragmented data. As such, the receiving wireless device 12A, 12B, 12C, 12D may send the contention grant 54 that includes the amount of data the downstream the wireless device 12A, 12B, 12C, 12D may send. The downstream wireless device 12A, 12B, 12C, 12D may then fragment the packet to the size granted, complete the data transmission, and defer the remainder of the fragmented data packet until the next opportunity. In one embodiment, the transmitting wireless device 12A, 12B, 12C, 12D may determine how to fragment the data to a size that fits into the remaining dwell time, thereby maximizing the occupied bandwidth.

If, block 92, the expected transmission time is shorter than the remaining dwell time, the wireless device 12A, 12B, 12C, 12D may proceed to block 96. At block 96, the transmitting wireless device 12A, 12B, 12C, 12D may continue transmitting the data (i.e., sending a contention grant 54).

Figure 10:
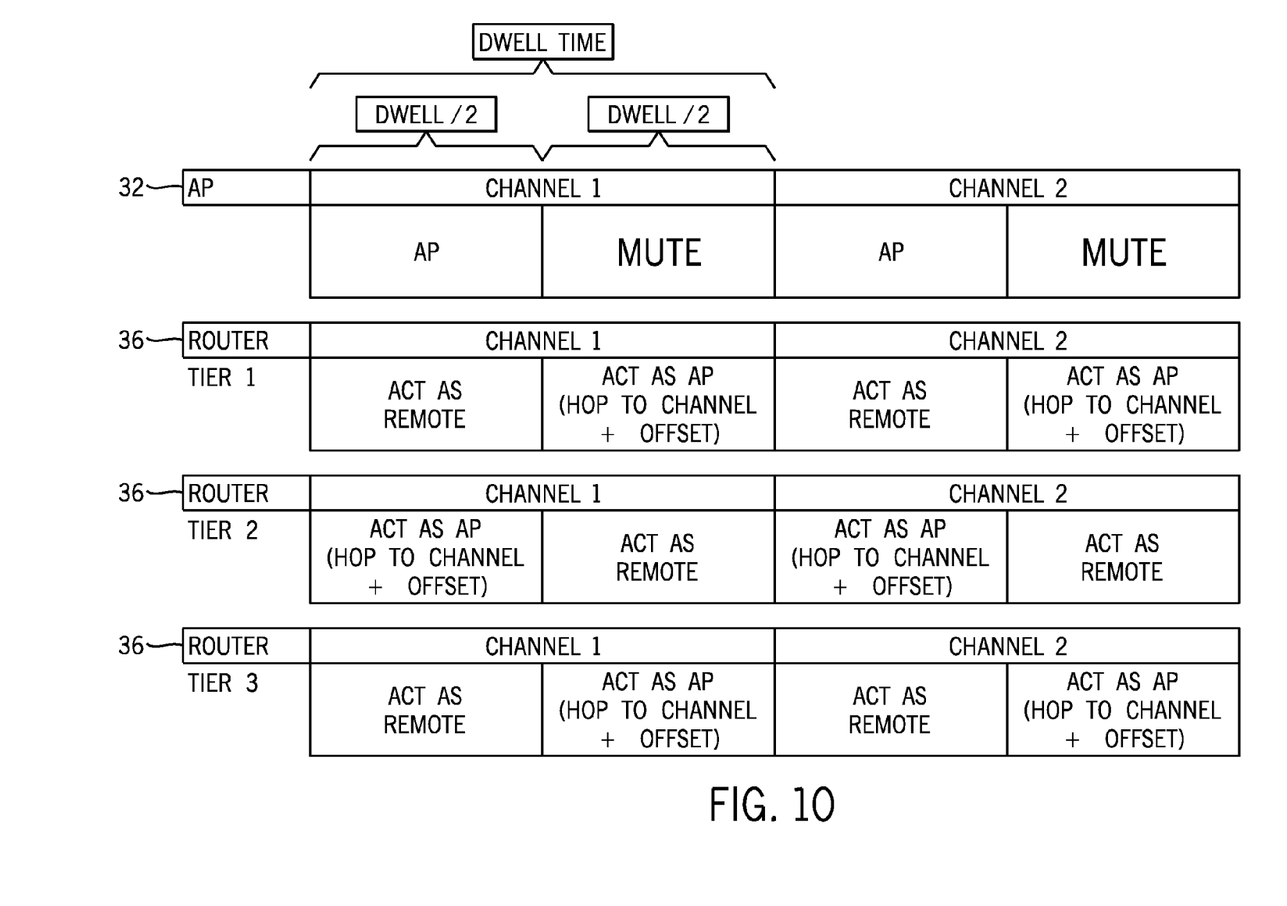
FIG. 10 is a timing diagram that may be employed in the wireless communication system of FIG. 1, in accordance with an embodiment of the present disclosure.

To further minimize latency in the tree network 40, the wireless device 12A, 12B, 12C, 12D in the wireless communication system 10 may simultaneously operate non-interfering tiers of the wireless communication system 10. As mentioned above, all of the wireless device 12A, 12B, 12C, 12D may use association frames to keep track of the routing information between the access point 32 and the wireless device 12A, 12B, 12C, 12D. The routing information may also include any offsets they may use to determine frequency channels for the frequency hops. Because of this, the routers 36 in every other tier of the wireless communication system 10 may act as access points while the routers 36 in the tier above and below the respective routers 36 may act as remotes 34, as shown in FIG. 10. As a result, all wireless devices 12A, 12B, 12C, 12D may be active at the same time, further reducing latency. Additionally or alternately, the remotes 34 may become inactive or enter a low power cycle during periods of the dwell time when the access point 32 or the routers 36 within the same tier are silent or acting as the remotes 34, respectively. This may reduce power consumption among the remotes 34, thereby reducing the power consumption in the wireless communication system 10 overall.

In certain embodiments, the access point 32 may automatically split dwell times in half. As such, the first half of the dwell time may be used for the access point 32 to communicate with its direct network, while the second half may be reserved for communications within the indirect network (i.e., via a router). The access point 32 may remain silent during the second half of the dwell time, and any first tier routers 36 may act as remotes in a star network 38 during the first half of the dwell time. During the second half of the dwell time, the first tier routers 36 may hop to a new frequency channel calculated using the offset provided in the association frame 60 and may then act as the access point 32 of their local network.

One or more of the disclosed embodiments, alone or in combination, may provide one or more technical effects useful for wireless communication systems. Certain embodiments may reduce the risk of collisions between data transmissions. For example, embodiments disclosed herein may include using control signal frames to identify a device may transmit data at a given time. As such, the number of devices attempting to transmit data at the same time on the same frequency channel may be reduced. Other embodiments may reduce the number of data transmissions interrupted by frequency hops. For instance, embodiments described herein may include a method for frequency hopping, such that any devices participating in a data transmission may remain on the same frequency channel until the transmission is complete. Still other embodiments may allow for data transmissions to occur at any time in a frequency hopping protocol. For example, embodiments presented herein may include a method for frequency hopping in which a device fragments the data being transmitted into multiple packets depending on the amount of time left before the next hop and the amount of data that needs to be transmitted. The technical effects and technical problems in the specification are exemplary and not limiting. It should be noted that the embodiments described in the specification may have other technical effects and can solve other technical problems.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method, comprising:
   determining, via a first wireless device of a plurality of wireless devices, a first amount of time remaining before a next scheduled frequency hop time;
   determining, via the first wireless device, a second amount of time for a downstream data transmission between the first wireless device and a second wireless device of the plurality of wireless devices to complete;
   fragmenting, via the first wireless device, a first data packet of the downstream data transmission into a first data packet fragment and a second data packet fragment when the second amount of time is greater than the first amount of time;
   sending, via the first wireless device, the first data packet fragment to the second wireless device using a first frequency;
   changing the first frequency of the first wireless device to a second frequency at the next scheduled frequency hop time;
   sending, via the first wireless device, the second data packet fragment to the second wireless device at the second frequency;
   determining, via the first wireless device, a third amount of time for an upstream data transmission between the first wireless device and a third wireless device of the plurality of wireless devices to complete; and receiving, via the first wireless device, a third data packet fragment from the second wireless device using the first frequency when the third amount of time is greater than the first amount of time, wherein the third data packet fragment comprises a portion of a second data packet of the upstream data transmission.

2. The method of claim 1, comprising sending, via the first wireless device, the data packet to the second wireless device when the second amount of time is not greater than the first amount of time.

3. The method of claim 1, wherein the second amount of time for the downstream data transmission between the first wireless device and the second wireless device is determined based on a bit rate associated with the downstream data transmission.

4. The method of claim 1, comprising fragmenting the second data packet fragment into a third data packet fragment and a fourth data packet fragment when a third amount of time for transmitting the second data packet fragment between the first wireless device and the second wireless device is greater than a fourth amount of time remaining before the next scheduled frequency hop time.

5. The method of claim 1, comprising sending, via the first wireless device, a synchronization frame to the second wireless device, wherein the synchronization frame comprises the second frequency and the next scheduled frequency hop time.

6. The method of claim 5, comprising sending, via the first wireless device, the synchronization frame to the plurality of wireless devices at the next scheduled frequency hop time.

7. The method of claim 1, comprising generating, via the first wireless device, an association frame comprising routing information that corresponds to the first wireless device with respect to the second wireless device.

8. A system, comprising:
a first wireless device configured to:
determine a first amount of time remaining before a subsequent scheduled frequency hop time;
determine a second amount of time for a downstream data transmission between the first wireless device and a second wireless device to complete;
fragment a first data packet of the downstream data transmission into a first data packet fragment and a second data packet fragment when the second amount of time is greater than the first amount of time; and
send the first data packet fragment to the second wireless device using a first frequency; and
a second wireless device configured to:
determine a third amount of time for an upstream data transmission between the first wireless device and the second wireless device to complete; and
send a third data packet fragment using the first frequency when the third amount of time is greater than the first amount of time, wherein the third data packet fragment comprises a portion of a second data packet of the upstream data transmission.

9. The system of claim 8, wherein the first wireless device is configured to:
change the first frequency to a second frequency at the next scheduled frequency hop time; and
send the second data packet fragment to the second wireless device at the second frequency.

10. The system of claim 8, wherein the first wireless device is configured to send a synchronization frame to the second wireless device, wherein the synchronization frame comprises the second frequency and the next scheduled frequency hop time.

11. The system of claim 8, wherein the first data packet fragment 1s configured to be sent during the first amount of time.

12. The system of claim 8, wherein the first wireless device comprises an access point, a remote, or a router.

13. The system of claim 8, wherein the second wireless device comprises an access point, a remote, or a router.

14. The system of claim 8, wherein the second wireless device is configured to send the second data packet when the third amount of time is not greater than the first amount of time.

* * * * *